July 17, 1951     A. C. RUGE     2,561,318
RING TYPE FORCE MEASURING DYNAMOMETER
Filed Feb. 17, 1949

INVENTOR
ARTHUR C. RUGE
BY
ATTORNEY

Patented July 17, 1951

2,561,318

UNITED STATES PATENT OFFICE 2,561,318

RING TYPE FORCE MEASURING DYNAMOMETER

Arthur C. Ruge, Cambridge, Mass., assignor to Baldwin-Lima-Hamilton Corporation, a corporation of Pennsylvania Application February 17, 1949, Serial No. 76,957

12 Claims. (Cl. 201—63)

This invention relates generally to force measuring devices of the type employing a strain-sensitive force-responsive element, and more particularly to a device that is especially adapted for measuring either tension or compression loads.

In load weighing devices of this type, the load is weighed by measuring the strain change induced in a load sensitive element in response to a given axially applied load, the strain measurement preferably being made by using suitable electrical impedance strain gages, of which the bonded wire type strain gage is particularly adaptable. Various types of such weighing devices have been heretofore proposed and used, but the same have had certain limitations, particularly as to low load capacity units, such for instance as the strain-sensitive load elements having a higher degree of deflection than may be desirable or the strain gages having only a limited electrical output thereby contributing to the difficulty of utilizing the weighing units effectively for low load ranges.

It is an object of my invention to provide an improved low capacity load weighing unit of the electrical strain sensitive type having minimum deflection of the strain sensitive element with a high degree of electrical strain gage output.

A further object is to provide such a minimum-deflection high-output unit having additionally a high degree of sensitivity and accuracy combined with ruggedness, economy of construction, operation and maintenance, and ease of application to tension or compression load weighing.

Another object is to provide improved means for connecting the load sensitive element to diaphragms for laterally guiding one end of the sensitive element relative to a surrounding shell.

Other objects and advantages will be more apparent to those skilled in the art from the following description of the accompanying drawings in which.

Figure 1:
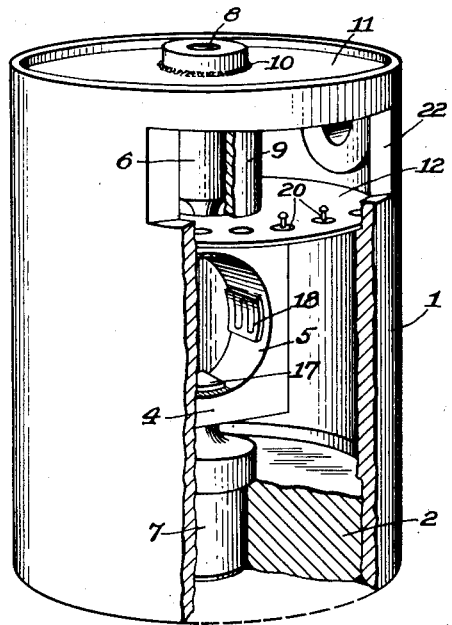
Fig. 1 is a perspective of my improved load weighing unit, parts of which are broken away to show certain details of construction.

In the specific form of the invention disclosed herein for purposes of illustration, I have shown the principles of my invention as embodied in a so-called tension-compression load cell type of unit consisting of an outer rigid shell 1 suitably welded to a relatively heavy base 2 and having my improved load strain-sensitive element 3 disposed within the shell. The sensitive unit more specifically comprises a flat rectangular metal block 4, preferably square or approximately square, having a circular transverse hole 5 bored symmetrically through it and provided with axially extending preferably cylindrical integral ends 6 and 7 for applying the load. The relative shapes of the block 4 and hole 5 produce alternate small and large sections 4a and 4b which, from a strain standpoint, may be termed sensitive and non-sensitive. The load applying ends 6 and 7 are shown provided with threaded holes 8 to receive studs for tension and/or compression loading. The end 7 is suitably welded or otherwise secured in base 2, while end 6 is disposed in a cylindrical sleeve 9 to which it is welded by a bead 10. Alternatively, end 6 may be a press or shrink fit into or otherwise fixed to sleeve 9 and the assembly may be hermetically sealed by solder or other medium at 10. The upper end of the sensitive element is guided against eccentric loading by a pair of flexible annular diaphragms 11 and 12 suitably seated on shoulders of casing 1 and having axial openings to receive sleeve 9, all of which are secured together by silver soldering, brazing, or the like. The diaphragms allow frictionless movement of the strain-sensitive element along its axis while firmly supporting the strain-sensitive element against lateral movement and eccentric loading. The axis, for purposes hereof, will be considered as the axis of cylindrical ends 6 and 7. When only tension loads are concerned, or where there is pure axial compression, the outer case and diaphragm supports are not required.

Figure 2:
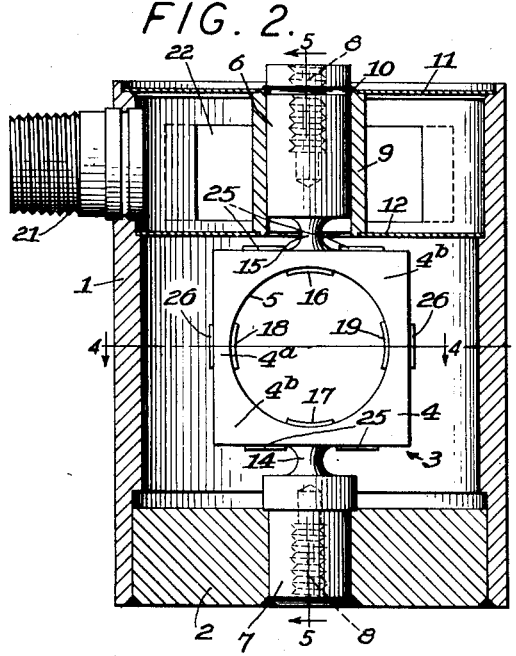
Fig. 2 is a cross-sectional view of the cell.

The cylindrical ends 6 and 7 are spaced from the rectangular block 4 and connected thereto by relatively small circular necks 14 and 15 preferably identical and whose sides are preferably curved axially to provide suitable fillets. Necks 14 and 15 need not be circular but can as well be rectangular or other reduced section. The circular form is often preferable from the standpoint of economical machining. The essential requirement is that the means for applying load to the rectangular element 4 be of small dimension (in the projection shown in Fig. 2) relative to the size of the hole 5. The final choice of neck dimension is generally limited by the load carrying capacity of the neck which must of course be large enough for safety. The neck size is not a critical matter so long as these conditions are met. However, as explained more fully below it is generally advantageous to make the neck size such that the stresses at gages 16, 17, 18 and 19 are approximately the same in order to get maximum gage output at rated load and at the same time realize the greatest possible safety factor against failure. Electrical strain gages, preferably of the bonded wire type, are secured to the surface of bore 5 at diametrically opposite points of like strain 16, 17 and 18, 19. The gage filaments extend circumferentially of the hole over a short concentrated strain area thereof and lead-in wires pass through suitable sealed small holes 20, Fig. 1, in the lower diaphragm and terminate in a usual electrical connector or cable packing gland 21. These connections may be made, or inspected, through a suitable window 22 which is finally closed and hermetically sealed by soldering in a suitably shaped metal piece.

Figure 3:
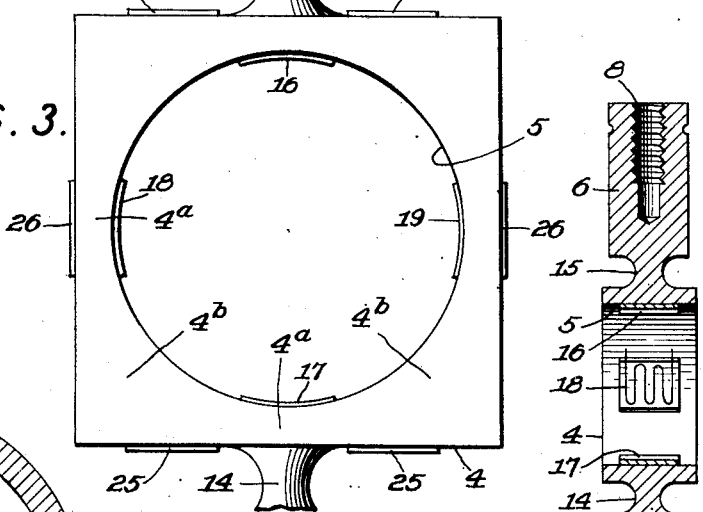
Fig. 3 is an enlarged side elevation of my improved load strain-sensitive element.
Figure 4:
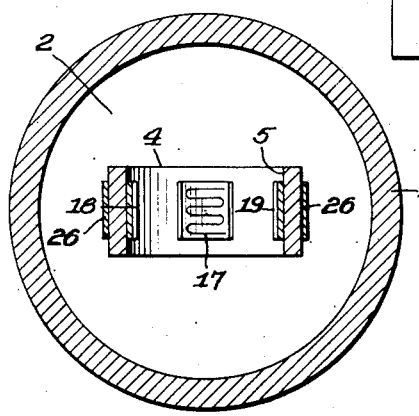
Fig. 4 is a horizontal section taken on the line 4—4 of Fig. 2.
Figure 5:
Fig. 5 is a vertical section taken substantially on the line 5—5 of Fig. 2 showing the strain sensitive element by itself.

Fig. 3 shows a projection of the strain sensitive element 4 and load transmitting means 14 and 15, the projection being taken on a plane parallel to the axis along which load is to be applied. A transverse hole 5, the axis of which intersects the plane of the projection, extends through element 4. As shown the transverse hole 5 is symmetrical about its axis and circular in form. It will be seen that the load transmitting means 14 and 15 are located adjacent to two diametrically opposed localized strain areas in the region of gages 16 and 17, and substantially on the load axis. Two more diametrically opposed localized strain areas are located in the region of gages 18 and 19. Between the localized strain areas lie relatively rigid wall sections bounded by the corner regions of the perimeter of element 4, which is seen to be rectangular in form in a plane parallel to the load axis.

I have been able to accomplish a large magnitude of concentrated strain at the particular strain gage points combined with minimum overall deflection of the load sensitive element by the combination of the relatively small necks 14 and 15 with the alternate large and small sections of the rectangular form of strain sensitive element 4. The square form of this element, together with the shape of hole 5, gives high stresses at the four diametrically opposite narrow sections containing the strain gages thereby producing maximum strain at these points, and yet because of the heavy relatively unyielding or low strain corner portions of the square between the gages, the overall deflection is kept to a minimum. By placing the gages at the points of deliberately designed high stress concentration, I am able to get high output and still retain a high factor of safety against mechanical failure.

It will be understood that preferably the gages constitute respectively the four arms of a Wheatstone bridge or other suitable measuring circuit arranged so that when the unit is under, say, a compression load, the output of gages 16 and 17, in tension, will be cumulative with the output of gages 18 and 19, in compression. When the unit is used for tension loads, the gages 16 and 17 will be in compression and the gages 18 and 19 in tension so that their output can again be cumulative. Thus, it is seen that the electrical output of the gages is much larger than the output of load cells of the form employing a single tension or compression column type load sensing element and yet I am able to have the same factor of safety as with such a single column cell. The square form of element 4 has the further advantage of ease and economy in machining especially as compared to usual circular rings that are employed for load weighing.

Strain gages may be and sometimes are advantageously placed at 25 and 26 for load measurement, it being simpler to apply gages to an outside flat surface.

Inasmuch as the necked-down sections 14 and 15 constituting means for transmitting load to rectangular member are an important factor in producing high stresses inside of the hole immediately opposite the necks, it is desired to point out, for purposes of illustration, the specific dimensions of the load sensing elements for one particular size unit of 500 pounds capacity. The block 4 is $1^{29}/_{64}''$ square and $\frac{1}{2}''$ thick, the hole diameter is $1\frac{1}{4}''$, the necked portions at their smallest diameters are $\frac{1}{8}''$, and the load applying members 6 and 7 are about $\frac{5}{8}''$ diameter. It will, of course, be understood that these dimensions will be different for larger or smaller capacity units and that the necks could for example be rectangular in cross section, say $\frac{1}{8}'' \times \frac{1}{2}''$. In general, the necessary dimensions of the necked-down portions may be determined by simply placing the gages at the four points indicated by 16, 17, 18, 19 and then successively loading the member 4 and removing a small amount of material from the necked-down portions until the strains induced at gages 16 and 17 are substantially equal to the strain induced by gages 18 and 19. The diameter of hole 5 will be governed by convenience of gage application and by the degree of strain sensitivity desired at the gage locations, consistent of course with maintaining whatever safety factor is desired. The load applying members and necked-down portions are preferably integral with the main body of the load sensitive block.

From the foregoing disclosure, it is seen that I have provided a very effective low capacity load weighing unit capable of measuring either tension or compression loads with a high degree of strain sensitivity and minimum deflection capable of producing a high electrical output from the output of the strain gages, the device also being economical in construction and compact and rugged and having an optimum factor of safety against mechanical failure. While the specific form of the device shown herein is particularly useful as a load weighing unit, its principles are broadly applicable to other force measuring applications regardless of whether a mechanical, fluid or other type of force is applied to the strain sensitive member. In each instance the application of force applied to said member in opposite directions diametrically of said bore effects a circumferential bending distortion in said sides, the bending distortion being more concentrated at the narrow sections of said sides than at their larger sections.

It will, of course, be understood that various changes in details of construction and arrangement of parts may be made by those skilled in the art without departing from the spirit of the invention as set forth in the appended claims.

I claim:

1. A load weighing device comprising a strain sensitive element which in a given plane parallel to an axis along which load is to be applied to the element has a perimeter of rectangular shape and also has a transverse hole therethrough whose axis intersects said plane, said sensitive element having relatively rigid wall sections between the hole and perimeter at spaced locations around the hole so as to be subject to minimum strain in response to load and substantially diametrically opposed intermediate wall sections that are thinner than said rigid sections thereby forming areas of localized load induced strain concentrations, means for transmitting load to said sensitive element along the load axis and being of smaller dimension than the width of said hole when measured normal to the load axis in a projection on said given plane, said load transmitting means being located adjacent two of the substantially diametrically opposed localized strain areas substantially on the load axis, and electrical impedance strain responsive means secured to the surface of said element adjacent to one of said localized strain areas for measuring the surface strains thereof as an indication of the applied load.

2. A load weighing device comprising a strain sensitive element to which load is applied along a given axis, said element having a hole whose axis is substantially normal to a plane in which said load axis lies and also having alternate large and small sections between the hole and the perimeter of the element at spaced locations around the hole, the smaller sections being substantially diametrically opposed to each other along the load axis and also along an axis substantially normal to the load axis whereby the smaller sections have greater strain concentrations than the larger sections, electrical impedance strain responsive means secured to the surface of said element adjacent said smaller sections to measure the surface strains thereof, and means for applying load to said sensitive element adjacent the two opposed smaller sections along the load axis.

3. A load weighing device comprising a strain sensitive element to which load is applied along a given axis, said element having a hole whose axis is substantially normal to a plane in which said load axis lies and also having alternate large and small sections between the hole and perimeter at spaced locations around the hole, two of said small sections being diametrically opposed to each other along the load axis and another two of said small sections being diametrically opposed along an axis normal to the load axis, means for applying load to said sensitive element adjacent two of the opposed smaller sections substantially along the load axis so that the strains induced therein inside the hole are substantially equal to the strains induced in the other of the opposed small sections inside the hole, and electrical impedance strain responsive means secured to the surface of the hole adjacent each of said small sections to measure the surface strains thereof.

4. A load weighing device comprising a substantially flat rectangular load sensitive element having a circular transverse hole disposed substantially symmetrically with respect to the sides of said rectangular element whereby the load sensitive element has relatively heavy sections at its corners and substantially diametrically opposed sections at each of its four sides narrower than the corner sections, means for applying a load to said member at two of the opposed narrow sections so as to induce substantially equal maximum strains in the surface of the hole adjacent all of said small sections while the heavier corner sections have substantially equal minimum strains, and electrical impedance strain responsive means secured to the surface of said hole adjacent to certain of said small sections to measure the surface strains thereof.

5. A load weighing device comprising a strain sensitive element which in a given plane parallel to an axis along which load is to be applied to the element has a perimeter of rectangular shape and also has a symmetrical hole therethrough whose axis intersects said plane, said element having two sets of substantially opposed narrow sections of localized strain concentration with intermediate relatively rigid areas of minimum strain, load applying members extending axially in opposite directions from said load sensitive element and connected thereto adjacent two of the opposed narrow sections by load transmitting members proportioned so that strains induced in the adjacent small sections are substantially the same as the strains induced in the other opposed narrow sections, and electrical impedance strain responsive means secured to the surface of said hole adjacent to a plurality of the narrow sections to measure the surface strains thereof.

6. The combination set forth in claim 5 further characterized in that the load applying members are cylindrical and the load transmitting members are axially curved, the load applying members, load transmitting members and the load sensitive element comprising an integral structure.

7. A load weighing device comprising a rigid shell, a sleeve disposed at one end thereof and extending in the direction of the shell axis, an annular diaphragm connecting said sleeve to said shell to form a self-contained integral unit therewith, a strain sensitive load element disposed within said shell and being insertable therein from the opposite end thereof, said load element having an axially extending portion receivable within said sleeve upon insertion of the load element within the shell so that the axially extending portion is laterally supported by said sleeve, a base connected to the shell at said opposite end thereof and engageable with the end of said load element adjacent said opposite end, and electrical strain responsive means connected to said load sensitive element for measuring the load induced strains therein as an indication of the magnitude of the applied load.

8. The combination set forth in claim 7 further characterized in that said sleeve has a cylindrical bore and said axially extending portion is cylindrical and slidably receivable within said sleeve.

9. The combination set forth in claim 7 further characterized in that a second annular diaphragm also connects the sleeve to the shell as an integral part of said self-contained unit and is axially spaced from the other diaphragm.

10. A load weighing device comprising, in combination, a base, a rigid shell connected at one of its ends to said base, a load sensitive element disposed within said shell and extending in the direction of the shell axis, said element having axially extending cylindrical load applying portions, said base having an opening for receiving and engaging one of said cylindrical portions so that the latter is externally accessible, an annular diaphragm connected to said shell and to said other cylindrical portion for laterally guiding the load sensitive element during axial deflection thereof under load, said cylindrical portions being adapted to transmit tension and compression loads to the sensitive element and having means to receive tension and compression load applying members, and electrical strain responsive means connected to said load sensitive element for measuring load induced strains therein as an indication of the magnitude of the load.

11. A force measuring device comprising a member having two substantially straight parallel sides and also having a bore whose axis is parallel to said sides, said member when cut by a plane normal to the axis of said bore having relatively narrow sections at intermediate points of said sides and larger sections at the ends thereof so that a force applied to said member in a direction normal to the axis of said bore effects a higher degree of strain adjacent said narrow sections than at said larger sections, and electrical impedance strain gage means mounted on said member adjacent one of said narrow sections so that the surface strains induced therein in response to the applied force are an indication of the magnitude of the force.

12. A force measuring device comprising a member having two substantially straight parallel sides and also having a bore whose axis is parallel to said sides in substantially symmetrical relation thereto, said member when cut by a plane normal to the axis of said bore having relatively narrow sections at intermediate points of said sides and larger sections at the ends thereof so that application of force applied to said member in opposite directions diametrically of said bore effects a circumferential bending distortion in said sides, the bending distortion being more concentrated at the narrow sections of said sides than at their larger sections, and electrical impedance strain gage means mounted on said member adjacent one of said narrow sections so that the concentrated surface strains induced therein in response to the applied force are an indication of the magnitude of the force.

ARTHUR C. RUGE.

REFERENCES CITED

The following references are of record in the file of this patent:

UNITED STATES PATENTS

| Number | Name | Date |
| --- | --- | --- |
| 2,405,199 | Faust et al. | Aug. 6, 1946 |
| 2,414,161 | Moore | Jan. 14, 1947 |
| 2,435,254 | Ramberg | Feb. 3, 1948 |
| 2,440,706 | Tint | May 4, 1948 |
| 2,488,349 | Thurston | Nov. 15, 1949 |

OTHER REFERENCES

Van Leeuwen et al., "Resistance Wire Strain Gage Applications and Circuits," pages 443–449 of Product Engineering, July 1945. (Page 448 relied upon.)